Sept. 5, 1950 A. A. BIRCH 2,521,627
DOUGHNUT FORMING DEVICE
Filed June 28, 1949

Alexander A. Birch
INVENTOR

BY C. A. Snow & Co.
ATTORNEYS.

Patented Sept. 5, 1950

2,521,627

UNITED STATES PATENT OFFICE 2,521,627

DOUGHNUT FORMING DEVICE

Alexander A. Birch, Clawson, Mich.

Application June 28, 1949, Serial No. 101,814

3 Claims. (Cl. 107—14)

This invention relates to a device designed for use in forming and dropping doughnuts directly from the device into the vessel in which the doughnuts are cooked.

An important object of the invention is to provide a device of this character including a body portion in which a movable disc-like valve operates under the action of the dough being forced thereagainst, in forming the doughnut, the movable member or valve operating to properly shape the dough upon movement thereof in one direction, and then cut the dough from the batch contained in the body portion of the device, upon the return of the disc valve to its normal position within the body portion of the device.

Another important object of the invention is to provide a device of this character, wherein the spring which operates the valve, will be encased so that it cannot contact with the dough which is being forced from the device in the formation of the doughnuts, thereby providing a structure which may be readily maintained in a clean sanitary condition.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
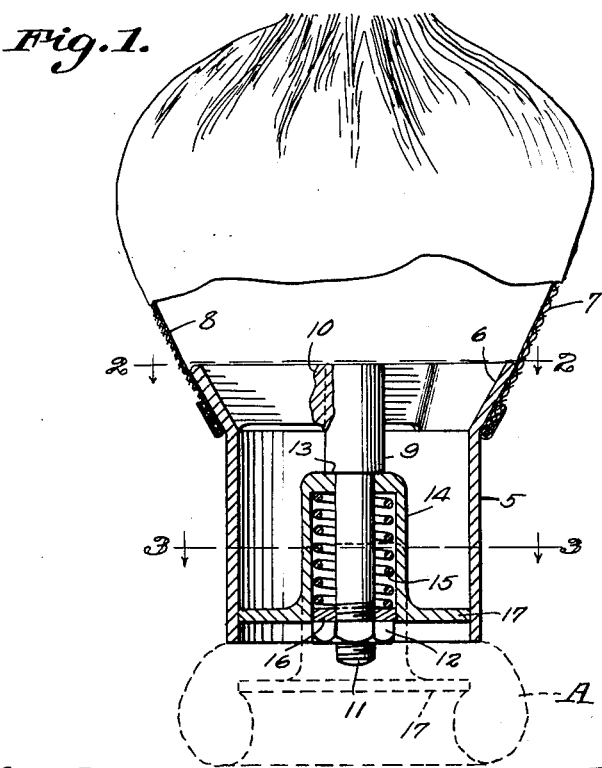
Figure 1 is a vertical sectional view through a doughnut forming device, constructed in accordance with the invention.
Figure 2:
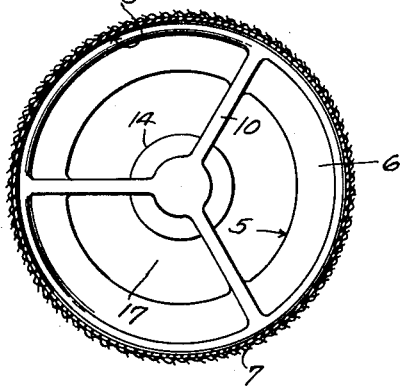
Fig. 2 is a sectional view taken on line 2—2 of Fig 1.
Figure 3:
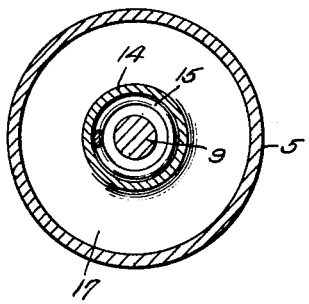
Fig. 3 is a sectional view taken on line 3—3 of Fig. 1.

Referring to the drawing in detail, the device comprises a cylindrical body portion indicated by the reference character 5, which body portion is provided with an upper flared end 6 over which the lower end of the sack or container 7 is secured, the sack 7 embodying an outer fabric casing lined with a suitable plastic material capable of flexing with the fabric casing, the plastic lining being indicated by the reference character 8.

The upper end of the sack is open so that the dough to be formed into the doughnuts, may be positioned therein from the open upper end.

The reference character 9 indicates the main supporting post which is secured to the spider 10 and extends downwardly therefrom, the post 9 being reduced in diameter throughout the major portion of its length, the lower end of the post being threaded as at 11 to accommodate the nut 12.

Formed on the post 9, is the shoulder 13 against which the tubular housing 14 engages at the limit of the upward movement of the tubular housing.

Mounted within the tubular housing, with its upper end engaging the upper end of the tubular housing, is the coiled spring 15 which has its lower end resting against the washer 16 that in turn rests on the nut 12. Thus it will be seen that the action of the coiled spring is such as to normally urge the tubular housing 14 to the limit of its upward movement.

Formed integral with the tubular housing 14, is the annular flange 17 that is of a diameter to move within the cylindrical body portion 5, as clearly shown by Fig. 1 of the drawing.

In the use of the device, the dough contained in the sack 7 is squeezed causing the dough to move under pressure, against the annular flange 17, moving the flange 17, together with the housing 14, downwardly, to the dotted line position, as shown by Fig. 1 of the drawing. The dough is also shown in dotted lines and indicated by the reference character A.

When the pressure is released on the dough, the spring 15 is of sufficient strength to return the housing 14 and flange 17 to its full line position, shown by Fig. 1, with the result that the dough is cut off at the end of the cylindrical body portion 5, the dough being formed into a doughnut with the circular opening formed centrally thereof. The doughnut may now be dropped into the vessel in which it is to be cooked, and by repeating the operation, other doughnuts may be made.

Having thus described the invention, what is claimed is:

1. A doughnut forming device comprising an open ended cylindrical body portion having an upper flared end, a dough containing sack secured over the flared end of the body portion, a supporting post mounted within the body portion and disposed centrally thereof, a tubular spring housing slidably mounted on the post, a coiled spring mounted within the housing normally urging the housing into the body portion, an annular dough cutting flange formed on the lower end of the housing cooperating with the lower edge of the body portion in cutting dough forced from the body portion, by pressure directed to the sack.

2. A dough forming device comprising an open ended cylindrical body portion, a dough containing sack secured to one end of the body portion in communication with the body portion, a post supported within the body portion and disposed centrally thereof, a shoulder formed on the post, a tubular housing mounted on the post and movable into engagement with the shoulder restricting vertical movement of the housing, a coiled spring mounted on the post and disposed within the housing, one end of the coiled spring engaging the housing normally urging the housing into engagement with the shoulder, a stop on the free end of the post against which one end of the spring rests, an annular cutting flange formed on the lower end of the housing and fitted within the body portion, said cutting flange cutting dough squeezed into the body portion from the sack, at the free end of the body portion.

3. A doughnut forming device comprising an open ended cylindrical body portion, a dough containing sack removably secured to one end of the body portion, and through which material is forced into the body portion by squeezing the sack, a spider extending across the upper end of the body portion, a post extending from the spider and disposed centrally of the body portion, a shoulder on the post, a movable member mounted on the post and normally held into engagement with said shoulder, a spring for moving the movable member to its normal position, a cutting flange mounted on the movable member and operating within the body portion cutting material at the lower end of the body portion, forming doughnuts.

ALEXANDER A. BIRCH.

REFERENCES CITED

The following references are of record in the file of this patent:

UNITED STATES PATENTS

| Number | Name | Date |
|---|---|---|
| Re. 16,143 | Lindsey | Aug. 13, 1925 |
| 2,447,182 | Hutchinson | Aug. 17, 1948 |